(12) United States Patent
Mizusawa

(10) Patent No.: US 9,107,177 B2
(45) Date of Patent: Aug. 11, 2015

(54) WIRELESS BASE STATION, TRANSMISSION POWER CONTROL METHOD AND COMPUTER PROGRAM

(75) Inventor: Nishiki Mizusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 350 days.

(21) Appl. No.: 13/552,848

(22) Filed: Jul. 19, 2012

(65) Prior Publication Data

US 2013/0040688 A1 Feb. 14, 2013

(30) Foreign Application Priority Data

Aug. 8, 2011 (JP) ................................ 2011-172927

(51) Int. Cl.
| | |
|---|---|
| H04B 7/00 | (2006.01) |
| H04W 52/36 | (2009.01) |
| H04W 52/14 | (2009.01) |
| H04W 52/24 | (2009.01) |
| H04W 52/38 | (2009.01) |

(52) U.S. Cl.
CPC .......... *H04W 52/367* (2013.01); *H04W 52/143* (2013.01); *H04W 52/245* (2013.01); *H04W 52/362* (2013.01); *H04W 52/38* (2013.01)

(58) Field of Classification Search
CPC . H04W 52/00; H04W 52/143; H04W 52/245; H04W 52/38; H04W 52/362; H04W 52/367

USPC .................... 455/69, 522; 370/318
See application file for complete search history.

(56) References Cited

U.S. PATENT DOCUMENTS

| | | | | |
|---|---|---|---|---|
| 8,208,363 | B2 * | 6/2012 | Kishiyama et al. | 370/204 |
| 2009/0264155 | A1 * | 10/2009 | Nakayama et al. | 455/561 |
| 2010/0054237 | A1 * | 3/2010 | Han et al. | 370/350 |
| 2010/0111022 | A1 * | 5/2010 | Chang et al. | 370/329 |
| 2011/0003597 | A1 * | 1/2011 | Budic et al. | 455/450 |
| 2011/0158196 | A1 * | 6/2011 | Power et al. | 370/329 |

FOREIGN PATENT DOCUMENTS

JP 2010-283756 A 12/2010

* cited by examiner

*Primary Examiner* — Raymond Dean
(74) *Attorney, Agent, or Firm* — Sony Corporation

(57) ABSTRACT

Provided is a wireless base station including a power measurement unit for measuring a power of a reference signal for synchronization at a downlink adjacent frequency; a base station type acquisition unit for acquiring a type of a base station that transmits the signal at the downlink adjacent frequency; and a power setting unit for setting a maximum transmission power based on a measurement value of the power measured by the power measurement unit and the type of the base station acquired by the base station type acquisition unit.

14 Claims, 15 Drawing Sheets

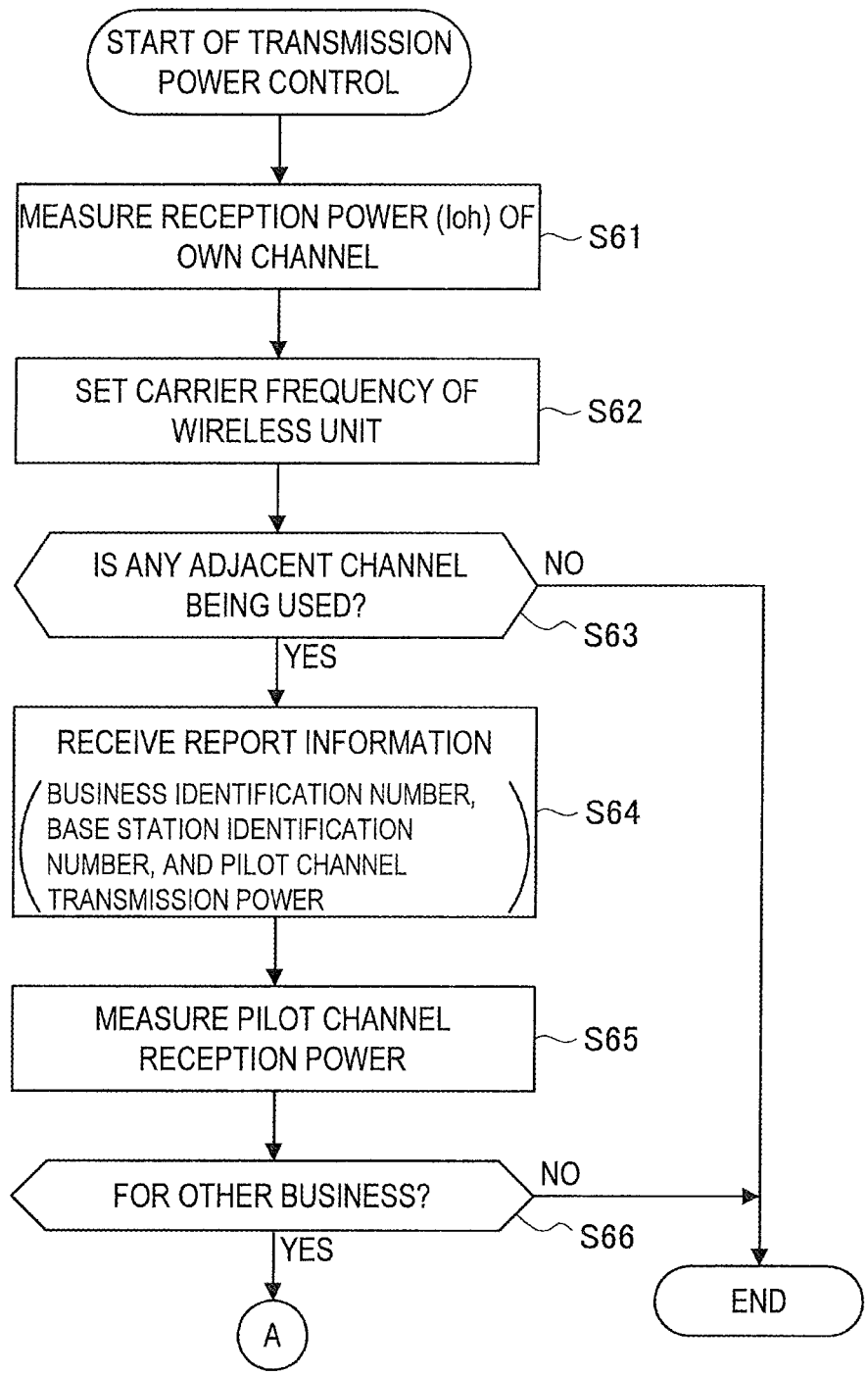

WIRELESS BASE STATION, TRANSMISSION POWER CONTROL METHOD AND COMPUTER PROGRAM

BACKGROUND

The present disclosure relates to a wireless base station, a transmission power control method, and a computer program.

Data communication traffic is rapidly increasing with the spread of data communication terminals of a UMTS (Universal Mobile Telecommunications System) scheme, an LTE (Long Term Evolution) scheme, or the like. In particular, a traffic solution for the proportionally large volume of indoor data communication is urgently necessary.

There is a low-power base station for indoor use (a femtocell) connected to the Internet or an operator's core network via a broadband line (hereinafter, a BB line), such as ADSL (Asymmetric Digital Subscriber Line), FTTH (Fiber To The Home) or CATV. Since the femtocell can connect between a data communication terminal and the Internet without going through a core network, the femtocell is expected as a solution to the rapidly increasing traffic described above.

Further, a femtocell is installed in a home or an office by a user and can limit users (terminals) that can use the femtocell. The femtocell performs near-field communication with a data communication terminal in a relatively small service area (coverage). Accordingly, the femtocell provides a communication environment with good communication quality and high throughput.

As a low-power base station, in addition to the femtocell, there is a picocell that does not limit users that can use the picocell. The picocell provides a communication environment with good communication quality and high throughput and is expected as a solution to traffic toward a core network, similar to the femtocell. Technology for controlling a femtocell has also been disclosed.

[Patent Literature 1] Japanese Patent Application Laid-Open No. 2010-283756

SUMMARY

In technology for determining a maximum transmission power of a femtocell in a related art, a terminal serviced from a wide-area base station (a macrocell) of an adjacent frequency channel (a macrocell terminal) can be protected, but if a femtocell of an adjacent frequency channel is installed in the vicinity of the femtocell, a power of the femtocell is unnecessarily limited. This degrades communication quality of a terminal serviced from the femtocell (a femtocell terminal).

The present disclosure has been made in view of these problems and an object of the present disclosure is to provide a wireless base station, a transmission power control method, and a computer program that are novel and enhanced and are capable of setting an appropriate maximum transmission power according to a type of adjacent base station.

According to an embodiment of the present disclosure, there is provided a wireless base station including: a power measurement unit for measuring a power of a reference signal for synchronization at a downlink adjacent frequency; a base station type acquisition unit for acquiring a type of a base station that transmits the signal at the downlink adjacent frequency; and a power setting unit for setting a maximum transmission power based on a measurement value of the power measured by the power measurement unit and the type of the base station acquired by the base station type acquisition unit.

According to another embodiment of the present disclosure, there is provided a transmission power control method including: measuring a power of a reference signal for synchronization at a downlink adjacent frequency; acquiring a type of a base station that transmits the signal at the downlink adjacent frequency; and setting a maximum transmission power based on a measurement value of the power measured in the power measurement step and the type of the base station acquired in the base station type acquisition step.

According to another embodiment of the present disclosure, there is provided a computer program for causing a computer to execute: measuring a power of a reference signal for synchronization at a downlink adjacent frequency; acquiring a type of a base station that transmits the signal at the downlink adjacent frequency; and setting a maximum transmission power based on a measurement value of the power measured in the power measurement step and the type of the base station acquired in the base station type acquisition step.

As described above, according to the present disclosure, it is possible to provide a wireless base station, a transmission power control method, and a computer program that are novel and enhanced and are capable of setting an appropriate maximum transmission power according to a type of adjacent base station.

BRIEF DESCRIPTION OF THE DRAWINGS

FIG. 9A is a flow diagram showing an operation of the control unit according to an embodiment of the present disclosure;

DETAILED DESCRIPTION OF THE EMBODIMENTS

Figure 1:
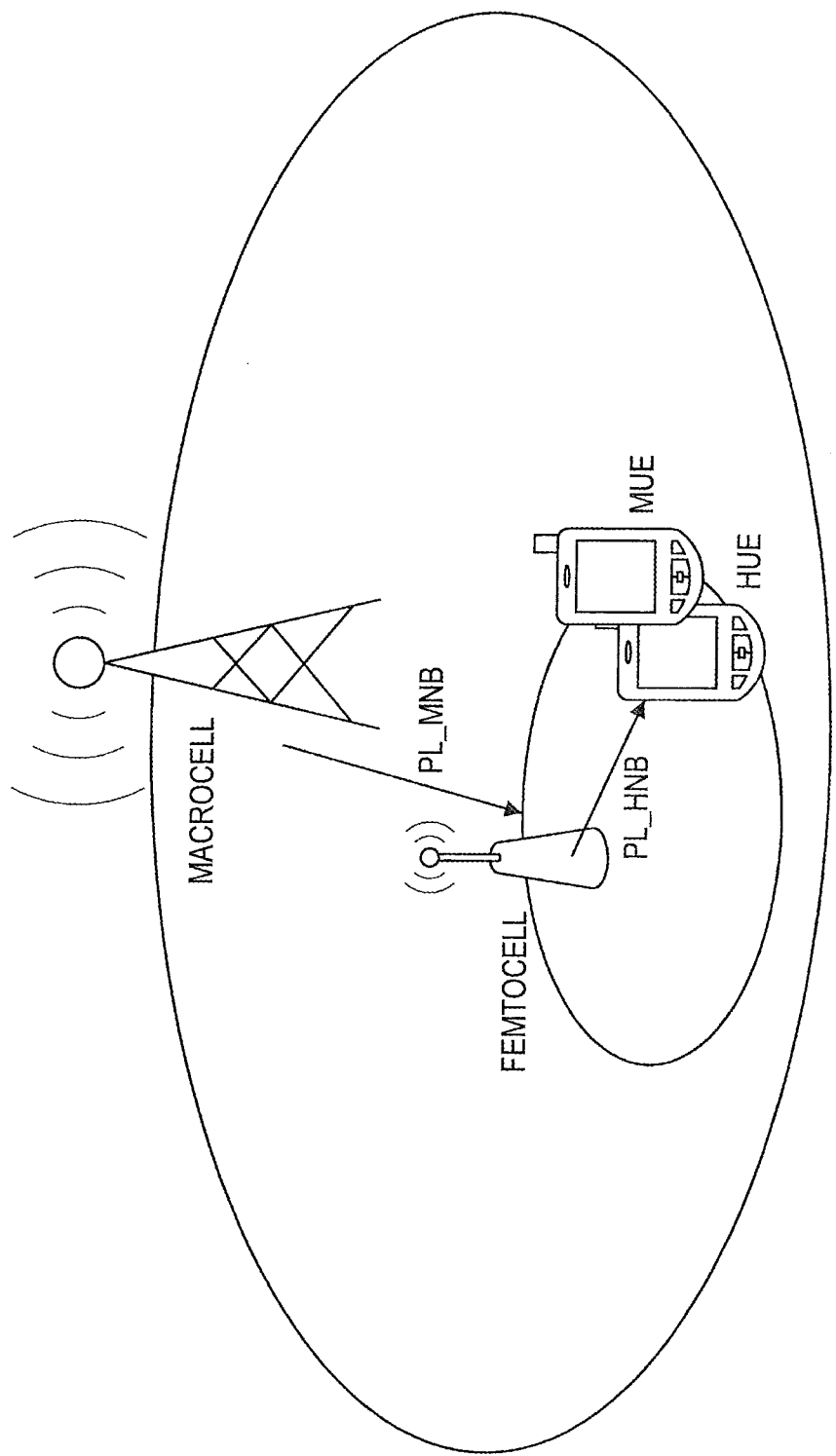
FIG. 1 is an illustrative diagram showing an arrangement example of a macrocell and a femtocell.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, a description will be given in the following order:
<1. Related Art and its Problems>
<2. Embodiment of the Present Disclosure>
[2-1. Overall Configuration of Data Communication System]
[2-2. Method Using Another Calculation Method when Adjacent Channel is for Femtocell]
[2-3. Method of Excluding Power from Adjacent Femtocell]
[2-4. Method of Setting Threshold and Offset Value According to Base Station Type]
[2-5. Method of Setting Plurality of Maximum Transmission Power Candidates]
<3. Conclusion>

1. Related Art and its Problem

First, a related art and its problems will be described in describing a preferred embodiment of the present disclosure in detail.

FIG. 1 is an illustrative diagram showing an arrangement example of a macrocell and a femtocell. The macrocell is a wireless base station capable of covering a very wide range. On the other hand, the femtocell is a wireless base station that covers a much narrower range than the macrocell.

A maximum transmission power of the wireless base station refers to an allowed value of a total power transmitted by the wireless base station in an allowed frequency band. For example, physical channels on a downlink that a wireless base station of a UMTS scheme transmits to a terminal include a dedicated physical data channel (DPDCH) for transmission of data for an individual user, a dedicated physical control channel (DPCCH) for transmission of control information for the individual user, a common pilot channel (CPICH) that is a time reference of channel estimation or another channel, a common control physical channel (CCPCH) for transmission of report information, a synchronization channel (SCH) used for a terminal to perform cell search and synchronization, and the like. A power of, for example, the dedicated physical data channel varies with the number of users serviced by the wireless base station, but a maximum transmission power indicates a maximum value allowed for a total power of all the channels.

The terminal performs, for example, synchronization establishment and channel estimation by receiving a reference signal for synchronization transmitted by the wireless base station, and performs data transmission and reception to and from the wireless base station. Accordingly, it is necessary to enable the terminal to receive the reference signal for synchronization with good reception quality in order to provide good communication quality. The reference signal for synchronization refers to, for example, a common pilot channel (CPICH) in a UMTS scheme and a cell-specific reference signal (CRS) that is one of downlink reference signals in an LTE scheme. The reference signal for synchronization is transmitted with a certain transmission power at a fixed power ratio to the maximum transmission power (e.g., the maximum transmission power −10 dB).

It is necessary for the wireless base station to suppress interference with another base station in order to secure its coverage and communication quality. Between base stations operated at the same frequency, interference is suppressed by separation based on a scrambling code and transmission power control, for example, in the UMTS scheme, and by radio resource (a sub-carrier frequency or resource block timing) separation and transmission power control, for example, in the LTE scheme. Between base stations operated at different frequencies, interference is suppressed by filter-based separation and transmission power control. For example, in the UMTS scheme, an adjacent channel rejection ratio of 33 dB can be obtained by a filter.

A wide-area base station (a macrocell) that provides coverage of a wide area and a large user capacity is a base station whose installation place and maximum transmission power are determined after detailed site survey has been carried out. Usually, the maximum transmission power of the wide-area base station is not changed unless there is a design change in a wireless network. On the other hand, the femtocell is a base station arbitrarily installed by a user. Since it is difficult for an operator to recognize, for example, an operation start time, it is necessary for the femtocell to have a function of autonomously setting radio parameters such as an optimal maximum transmission power. The radio parameters include a carrier frequency, a scrambling code, a base station ID, and the like, as well as the maximum transmission power, for example, in the case of the UMTS scheme.

For the femtocell to have a mechanism for limiting users (terminals) that can use the femtocell, interference is an important issue. In particular, avoidance of interference between a femtocell and a macrocell operated at the same frequency is absolutely necessary for the femtocell. A terminal serviced from the macrocell (a macrocell terminal), which is not authorized to access the femtocell, is not handed over to the femtocell even when a downlink signal from the femtocell becomes larger than a downlink signal from the macrocell due to the macrocell terminal being close to the femtocell. The downlink signal transmitted by the femtocell becomes an interference noise for the macrocell terminal. On the other hand, the downlink signal transmitted from the macrocell becomes an interference noise for a terminal serviced from the femtocell (a femtocell terminal).

Where the femtocell is installed, it is necessary to set, in the femtocell, radio parameters for avoiding an interference with a macrocell so that communication is not disabled by interference from the femtocell when the macrocell terminal is close to the femtocell. With respect to setting of the carrier frequency and the scrambling code among the above-described radio parameters in the UMTS scheme, for example, there is a method in which the femtocell, when starting up, accesses a femtocell management server and selects a carrier frequency and a scrambling code not to overlap a carrier frequency and a scrambling code used by a peripheral base station by referencing a carrier frequency list or a scrambling code list operated by the same operator.

On the other hand, with respect to the maximum transmission power among the above-described radio parameters, intensity of a radio wave transmitted by a peripheral base station can be measured by the femtocell and a maximum transmission power of the femtocell can be set to suppress interference with the peripheral base station as much as possible.

For example, a guideline on a method of controlling a transmission power of a femtocell (Home Node B) of a UMTS scheme has been introduced in 3GPP TR 25.967. In this guideline, a method by which a femtocell measures power of a reference signal for synchronization (pilot channel) of a peripheral macrocell to determine a maximum transmission power of the femtocell so that a signal-to-noise power ratio (CPICH Ec/No) in both a femtocell terminal and a macrocell terminal located in the vicinity of a boundary of a service area of the femtocell is higher than a level necessary for reception is shown. In this guideline, a power measurement value of the pilot channel of the macrocell by the femtocell is used as a measurement value of a terminal. This is because a small service area of the femtocell is included in a wide area of the macrocell and a distance between the femtocell and the terminal is smaller than a distance between the macrocell and the femtocell, as shown in FIG. 1.

Figure 2:
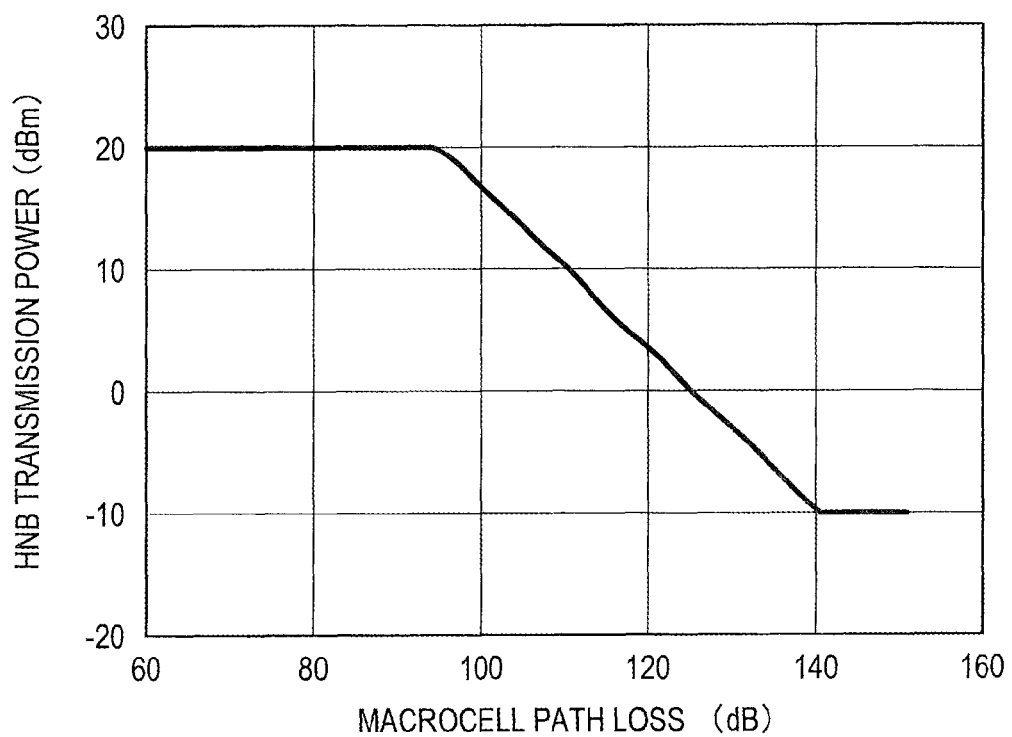
FIG. 2 is an illustrative diagram showing an example of a method of controlling a maximum transmission power of a femtocell according to a path loss between a macrocell and the femtocell.

FIG. 2 shows an example of a method of controlling a maximum transmission power of a femtocell according to a path loss between a macrocell and the femtocell when a range in which a propagation loss (a path loss) from the femtocell is 80 dB is a service area of the femtocell.

Figure 3:
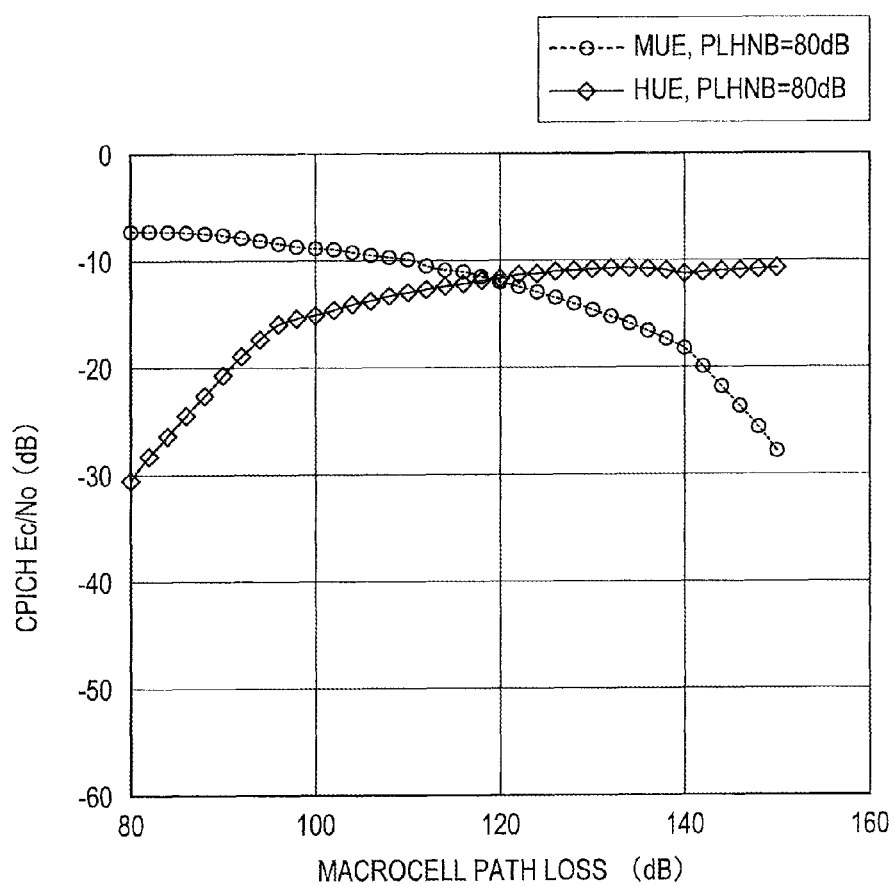
FIG. 3 is an illustrative diagram showing signal-to-noise power ratios of a macrocell terminal and a femtocell terminal.

FIG. 3 shows a signal-to-noise power ratio (CPICH Ec/No) of a macrocell terminal and a femtocell terminal present in positions with a path loss of 80 dB from the femtocell when the maximum transmission power of the femtocell is set as shown in FIG. 2. The path loss from the macrocell is assumed to be about 100 dB at a cell center and about 140 dB at a cell edge. It can be seen that a condition necessary for the macrocell terminal (CPICH Ec/No≥−18 dB) and a condition necessary for the femtocell terminal (CPICH Ec/No≥−15 dB) are nearly satisfied in a service area (a range of the path loss of 100 to 140 dB) of the macrocell. Thus, control of the transmission power of the femtocell based on the path loss between the macrocell and the femtocell may be used as a method of reducing interference from the femtocell, which operates with the same frequency as and a different scrambling code from the macrocell, to the macrocell terminal.

For example, a method of suppressing interference of a control channel between a femtocell (Home eNode B) and a macrocell of the LTE scheme by shifting, in time, radio frames of the femtocell and the macrocell, a method of suppressing interference of a data channel by dividing a sub-carrier in a used frequency band between a femtocell and a macrocell and using the sub-carrier not to overlap, or the like has been introduced in the 3GPP TR 36.921.

In addition, a base station detecting interference may send a message indicating radio resources where the interference occurs to a base station causing such interference, and perform control to decrease a power of the radio resources. However, the method in which synchronization between base stations is necessary, and the definition of the message between base stations that have not been standardized are methods that are possible with the same operator and it is difficult to apply the methods to base stations between different operators.

As already described, it is necessary for the femtocell to limit the maximum transmission power of the femtocell in order to suppress interference with the base station using the adjacent frequency channel. In particular, a method of limiting the maximum transmission power of the femtocell when another operator is operating the adjacent frequency channel so that a radio wave of the femtocell does not give interference to a terminal of the other operator who uses the adjacent channel to prevent service of the other operator from being obstructed has been standardized.

Figure 4:
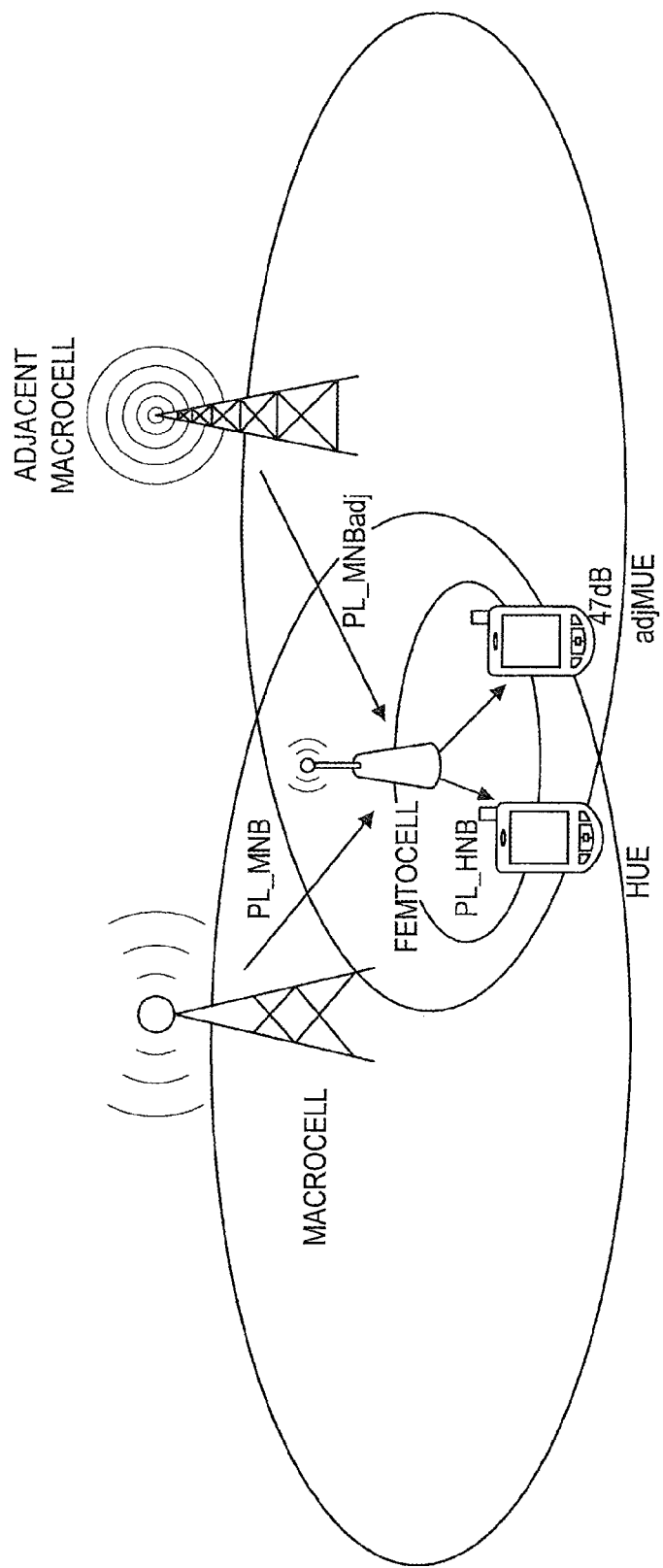
FIG. 4 is an illustrative diagram showing a state in which a service area of a femtocell is included in an area of a macrocell.

For example, a standard of a radio characteristic of a base station of a UMTS scheme is shown in the 3GPP TS 25.104. In the 3GPP TS 25.104, a maximum transmission power of a femtocell (Home Base Station) of the UMTS scheme is defined as +20 dBm. However, it sets a limit on the maximum transmission power of the femtocell of the adjacent channel CPICH Êc+100 dB when a radio wave of −105 dBm (a threshold for limiting the maximum transmission power) or more of the adjacent frequency channel of the other operator is observed in the vicinity of the femtocell. This offset of 100 dB is a sum of an adjacent channel rejection ratio 33 dB, 47 dB of a femtocell area (path loss) to protect an adjacent channel macrocell terminal, −18 dB of a signal-to-noise power ratio (CPICH Ec/No) necessary for a terminal, and 2 dB of a set error. In fact, 98 dB, excluding the set error, may be set as the offset. Here, the reception power measurement value CPICH Êc of the adjacent channel pilot channel indicates a measurement value by the femtocell, and the measurement value by the femtocell is treated as the measurement value of the terminal since a small service area of the femtocell is included in a wide area of the macrocell as shown in FIG. 4, and a distance between the femtocell and the terminal is smaller than a distance between the macrocell and the femtocell.

If a path loss between the adjacent channel macrocell and the femtocell is the same as a path loss between the adjacent channel macrocell and both terminals (a macrocell terminal and an adjacent channel macrocell terminal), a reception power (CPICH Ec) of the pilot channel of the adjacent channel measured by the femtocell and a power of the pilot channel of the adjacent channel received by the adjacent channel macrocell terminal may be considered to be the same. When the transmission power (HNBTxPo) of the femtocell is set to CPICH Ec+98 dB, a signal-to-noise ratio (adjMUE_CPICH_Ec/No) of the adjacent channel macrocell terminal present in a position with the path loss 47 dB from the femtocell is:

$$\begin{aligned} adjMUE\_CPICH\_Ec/No &= CPICH\ Ec\text{-}(HNBTxPo\text{-}47\text{-}33) \\ &= CPICH\ Ec\text{-}(CPICH\ Ec+98\text{-}47\text{-}33) \\ &= -18\ [dB] \end{aligned}$$

since the adjacent channel rejection ratio is 33 dB. Accordingly, −18 dB of the signal-to-noise ratio necessary for reception is secured.

Further, in addition to the above condition, when Ioh>CPICH Êc+43 dB, where Ioh denotes a total reception power (excluding the transmission power of the femtocell) in a frequency band used by the femtocell for a downlink, a limit of +10 dBm on the maximum transmission power is also set.

With the method in which the femtocell measures the intensity of the radio wave of the adjacent frequency channel and adds a certain offset to a reception power for the radio wave to determine the maximum transmission power of the femtocell, it is possible to protect an adjacent frequency channel macrocell terminal. However, for example, when the adjacent frequency channel femtocell is installed in the vicinity of the femtocell, communication quality of a terminal in the femtocell is degraded by unnecessarily limiting the power of the femtocell.

Figure 5:
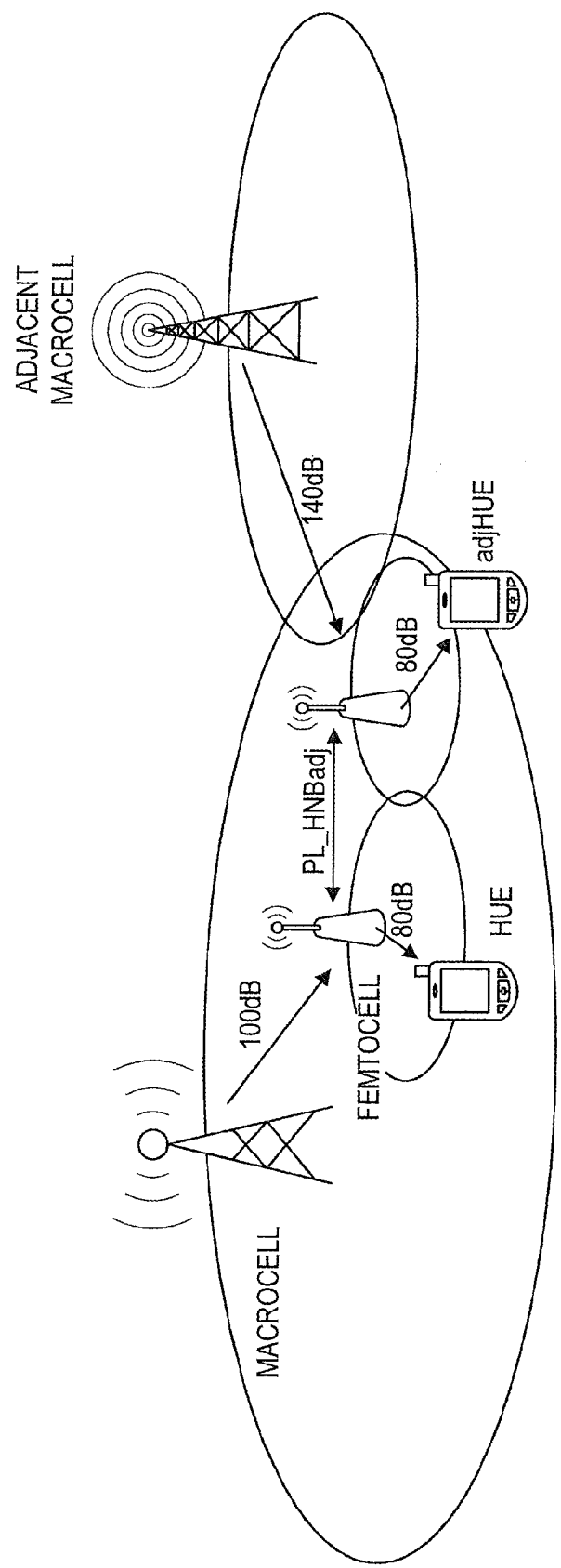
FIG. 5 is an illustrative diagram showing an arrangement example of a macrocell and a femtocell.
Figure 6:
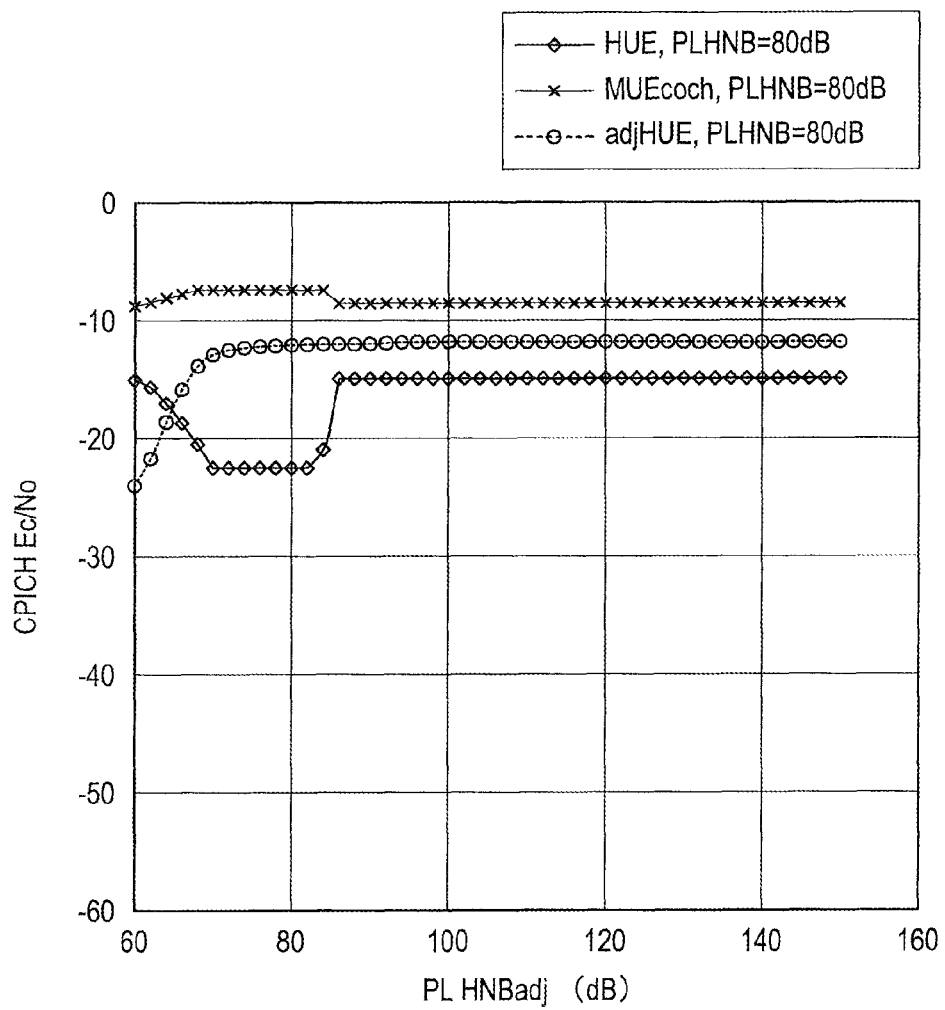
FIG. 6 is an illustrative diagram showing signal-to-noise power ratios of a macrocell terminal and a femtocell terminal.

For example, a case in which the femtocell and the adjacent frequency channel femtocell are installed in positions with path losses of 100 dB from the macrocell and 140 dB from an adjacent frequency channel macrocell, respectively, as shown in FIG. 5, is considered. The transmission power of the adjacent frequency channel femtocell is set to −10 dBm through the transmission power control of FIG. 2. In a method of related art in which a fixed offset is added to a measurement value for an adjacent frequency channel CPICH femtocell to determine a maximum transmission power of a femtocell, CPICH Ec/No of a terminal in a position with a path loss of 80 dB from each femtocell becomes as shown in FIG. 6 according to a path loss between the two femtocells. When the path loss between the two femtocells is 80 dB that is the same as a service area of the femtocell, it is difficult for the femtocell terminal to perform communication due to a degraded signal-to-noise ratio.

Thus, in the method of adding a certain offset to the reception power measurement value of the adjacent frequency channel measured by the femtocell to determine the maximum transmission power of the femtocell, the power of the femtocell is unnecessarily limited. Accordingly, the communication quality of the femtocell terminal may be degraded.

Further, since the femtocell is installed by a user, it is difficult for the operator to recognize, for example, an operation start time. Accordingly, it is necessary for the femtocell to have a function of autonomously setting radio parameters such as an optimal maximum transmission power. However, if the femtocell has a specification in which the setting of the transmission power is greatly affected each time an adjacent femtocell starts up, it is necessary for the femtocell to frequently measure a power of the peripheral femtocell and set its own transmission power again. Accordingly, the setting of the transmission power is not stable and the communication quality is degraded in an area in which femtocells are dense.

The present disclosure has been made in view of such a background, and the measurement of the radio wave intensity of the adjacent frequency channel and the acquisition of the base station type information by report information channel reception are simultaneously performed, the results of measuring adjacent frequency channels are classified for each base station type, and an offset or a calculation method appropriate for each base station type is used. Using such a method, it is possible to set an appropriate maximum transmission power of the femtocell.

The related art and its problems and the characteristics of the present disclosure have been described above. Next, an overall configuration of a data communication system according to an embodiment of the present disclosure will be described.

2. Embodiment of Present Disclosure

2-1. Overall Configuration of Data Communication System

Figure 7:
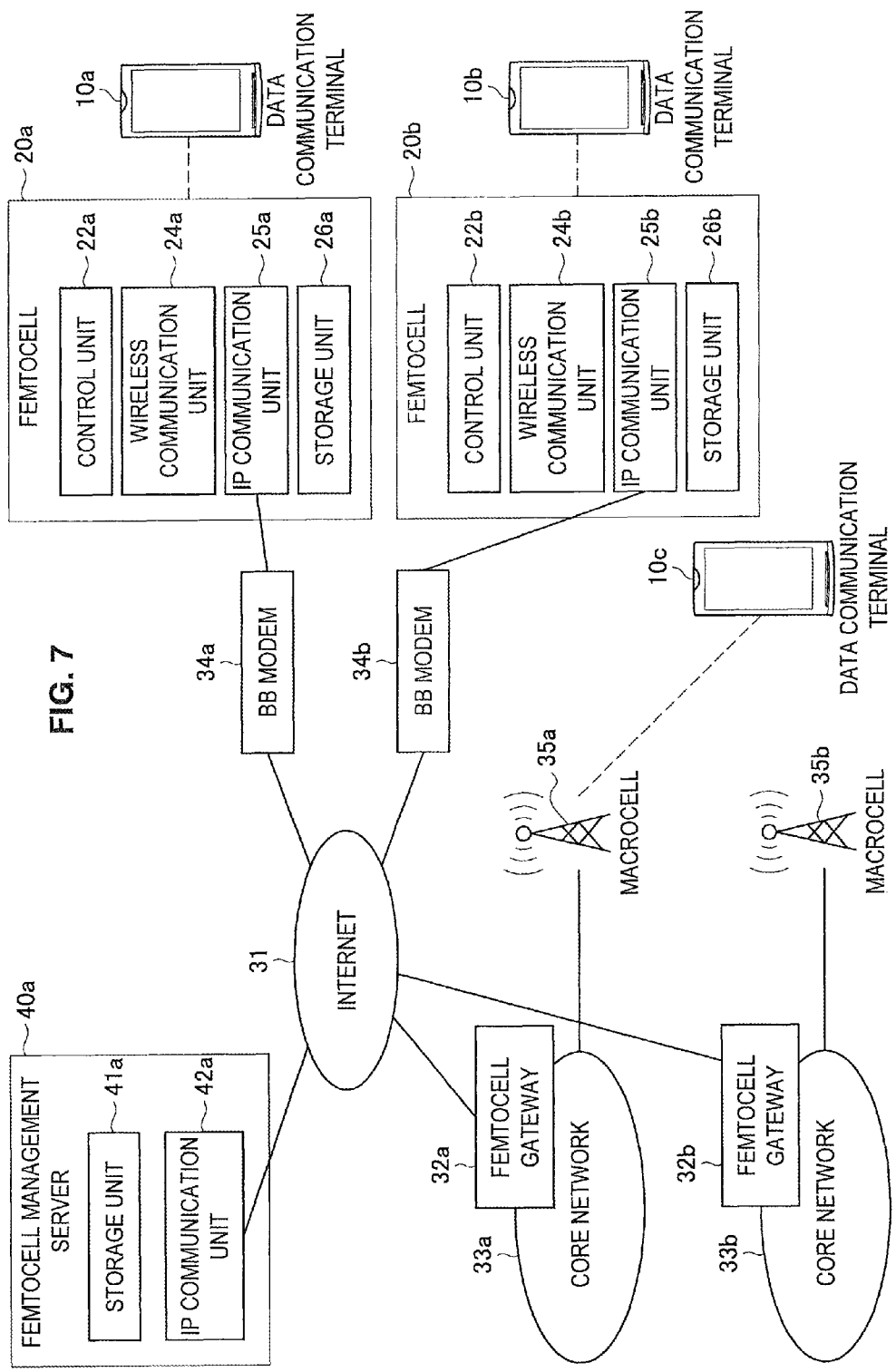
FIG. 7 is an illustrative diagram showing an overall configuration of a data communication system according to an embodiment of the present disclosure.

FIG. 7 is an illustrative diagram showing an overall configuration of a data communication system according to an embodiment of the present disclosure. Hereinafter, the overall configuration of a data communication system according to an embodiment of the present disclosure will be described with reference to FIG. 7.

A data communication system 1 shown in FIG. 7 is a data communication system including a femtocell. As shown in FIG. 7, the data communication system 1 according to an embodiment of the present disclosure includes data communication terminals 10a and 10b, femtocells (indoor small base stations) 20a and 20b, the Internet 31, femtocell gateways 32a and 32b, core networks 33a and 33b, BB line modems 34a and 34b, macrocells (outdoor base stations) 35a and 35b, and a femtocell management server 40a.

The macrocells (the outdoor base stations) 35a and 35b are base stations that cover a relatively wide range and have a cell radius of hundreds of m to tens of km. The femtocells (the indoor small base stations) 20a and 20b are base stations whose cell radius is tens of m and whose transmission power is small. The femtocells 20a and 20b may be installed and used at indoor places that are difficult for a radio wave of the macrocell to reach. The femtocells 20a and 20b, for example, are connected to the core networks 33a and 33b via the BB line modems 34a and 34b, BB lines, the Internet 31, and the femtocell gateways 32a and 32b, respectively.

Communication interfaces between the femtocells 20a and 20b and the femtocell gateways 32a and 32b are defined as, for example, standard interfaces of Iuh (3GPP TS 25.467).

The femtocells 20a and 20b include wireless communication units 24a and 24b for performing wireless communication with the data communication terminals 10a and 10b, IP communication units 25a and 25b for performing wired communication with the femtocell management server 40a or the femtocell gateways 32a and 32b, control units 22a and 22b for performing control of frequency switching of the wireless communication units for measurement of a downlink radio wave of a peripheral base station, pilot channel measurement control, and the like, and storage units 26a and 26b for storing an address of the femtocell management server 40a, addresses of the femtocell gateways 32a and 32b, IDs of terminals whose positions can be registered in the femtocells 20a and 20b, and the like, respectively. Further, radio parameters of the femtocells 20a and 20b, a threshold for maximum transmission power control, and an offset value are also stored in the storage units 26a and 26b.

The femtocell management server 40a is a server for performing launch preparation, maintenance or the like of a femtocell treated by one business, and includes an IP communication unit 42a for performing communication with the plurality of femtocells 20a and 20b, and a storage unit 41a. An identification number, a carrier frequency, a scrambling code, position information and the like used by the femtocell managed by the femtocell management server 40a are stored in the storage unit 41a. In FIG. 7, only one femtocell management server 40a operated by any business (e.g., referred to as a business A) is shown, but other businesses also operate such servers. Further, in the present disclosure, femtocells managed by a plurality of businesses may be managed by one femtocell management server.

If the femtocell 20a connected to the core network 33a of the business A is powered on, the femtocell 20a searches for a radio wave of a peripheral base station, measures a reception power of the base station, and receives and obtains report information of the base station. Further, the femtocell 20a is connected to the femtocell management server 40a, obtains information of a base station near a position indicated by position information registered in the femtocell management server 40a, compares the information with a measurement result of the femtocell 20a to confirm the position of the peripheral base station, and selects an optimal radio parameter not to overlap a radio parameter used by the peripheral base station.

The data communication terminal 10a and the data communication terminal 10c are terminals making a contract with the business A operating the core network 33a, and the data communication terminal 10b is a terminal making a contract with a business B operating the core network 33b. The femtocell 20a operated by the business A is connected to the core network 33a via the femtocell gateway 32a, and the femtocell 20b operated by the business B is connected to the core network 33b via the femtocell gateway 32b. Similarly, the macrocell 35a is a macrocell operated by the business A, and the macrocell 35b is a macrocell operated by the business B. The business A operates a downlink carrier frequency A, and the macrocell 35a and the femtocell 20a transmit the carrier frequency A in a downlink. The business B operates a downlink carrier frequency B, and the macrocell 35b and the femtocell 20b transmit the carrier frequency B in a downlink.

The overall configuration of a data communication system according to an embodiment of the present disclosure has been described above with reference to FIG. 7. Next, a configuration of the control unit 22a included in the femtocell 20a according to an embodiment of the present disclosure will be described.

Figure 8:
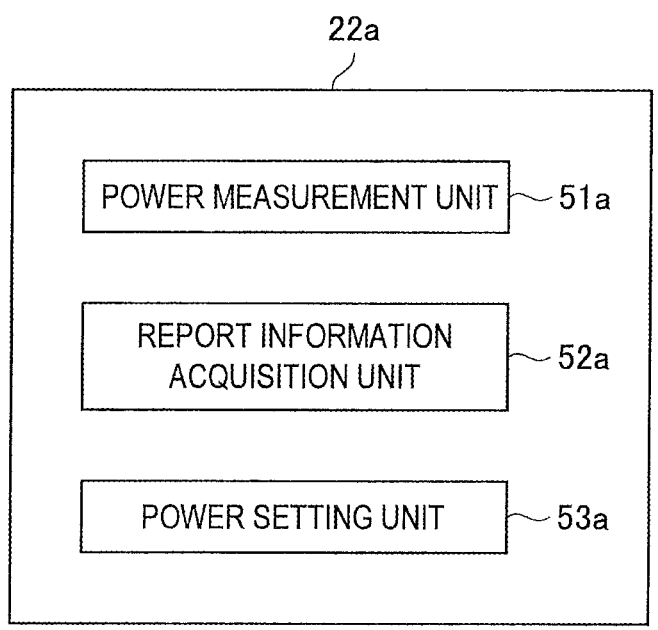
FIG. 8 is an illustrative diagram showing a configuration of a control unit according to an embodiment of the present disclosure.

FIG. 8 is an illustrative diagram showing a configuration of the control unit 22a included in the femtocell 20a according to an embodiment of the present disclosure. Hereinafter, the configuration of the control unit 22a included in the femtocell 20a according to an embodiment of the present disclosure will be described with reference to FIG. 8.

As shown in FIG. 8, the control unit 22a includes a power measurement unit 51a, a report information acquisition unit 52a, and a power setting unit 53a.

The power measurement unit 51a measures a power of a reference signal for synchronization at a downlink adjacent frequency. The power measurement unit 51a may not only measure the power of the reference signal for synchronization at the downlink adjacent frequency, but may also acquire report information, which is transmitted via a physical channel on the downlink.

The report information acquisition unit 52a acquires the report information. In the present embodiment, the report information acquisition unit 52a acquires a type of a base station that transmits a signal at the downlink adjacent frequency, contained in the report information. Accordingly, the report information acquisition unit 52a corresponds to a base station type acquisition unit of the present disclosure. Further, a method of acquiring the type of the base station in the report information acquisition unit 52a will be described later.

The power setting unit 53a sets the maximum transmission power of the femtocell 20a based on a measurement value of the power measured by the power measurement unit 51a and the type of the base station acquired by the report information acquisition unit 52a. The power setting unit 53a works without degrading communication quality of the terminal serviced from the femtocell 20a by setting the maximum transmission power of the femtocell 20a based on the measurement value of the power measured by the power measurement unit 51a and the type of the base station acquired by the report information acquisition unit 52a.

The configuration of the control unit 22a included in the femtocell 20a according to an embodiment of the present disclosure has been described above with reference to FIG. 8. Further, the control unit 22a may have the functional configuration as shown in FIG. 8, for example, by the control unit 22a reading and executing a computer program stored in the storage unit 26a.

The data communication terminal 10a and the data communication terminal 10b are at indoor places at which they can use the femtocells 20a and 20b. Meanwhile, the other data communication terminal 10c performs communication via the macrocell 35a. Since the data communication terminal 10a and the data communication terminal 10b are in a good radio wave communication environment with the femtocells 20a and 20b present at very close places, high throughput communication is possible. However, since the data communication terminal 10c is in communication with the distant macrocell 35a, a radio wave situation is bad. Also, since the data communication terminal 10c shares radio resources with other terminals, which share the same macrocell 35a, it is difficult to expect sufficient throughput.

If the data communication terminal 10c is close to the femtocell 20b, a downlink signal transmitted by the femtocell 20b is a noise for the data communication terminal 10c. Accordingly, when the transmission power of the femtocell 20b is greater, reception quality of the data communication terminal 10c is degraded. Conversely, if the transmission power of the femtocell 20b is too small, the reception quality of the data communication terminal 10b is degraded.

The embodiment of the present disclosure is intended to improve communication quality of the overall data communication system using the method of setting the transmission power of the femtocell, which moderately maintains reception qualities of both the femtocell terminal and the macrocell terminal. Hereinafter, the method of setting the transmission power of the femtocell will be described by way of concrete example.

2-2. Method using Another Calculation Method when Adjacent Channel is for Femtocell As a first method, a method of setting a transmission power of the femtocell 20a or 20b a method using another calculation method when an adjacent channel is for a femtocell will be described.

When an adjacent frequency channel macrocell is in a range of a protection condition (−105 dBm≤CPICH Ec in the UMTS scheme), that is, when a pilot channel reception power of the adjacent frequency channel macrocell exceeds a predetermined threshold (−105 dBm), the femtocell 20a or 20b adds an existing offset value (98 dB in the UMTS scheme) to the pilot channel reception power of the adjacent frequency channel macrocell to determine the maximum transmission power of the femtocell 20a or 20b. However, when a radio wave intensity of the adjacent frequency channel by the adjacent frequency channel femtocell is dominant, the femtocell 20a or 20b adds, for example, an offset value for the femtocell (e.g., 51 dB in the UMTS scheme) to the pilot channel transmission power of the adjacent frequency channel femtocell to determine the maximum transmission power of the femtocell 20a or 20b.

The offset value for the femtocell, 51 dB, is a sum of the adjacent channel rejection ratio 33 dB and a signal-to-noise ratio (CPICH Ec/No) −18 dB required at the end.

Figure 10:
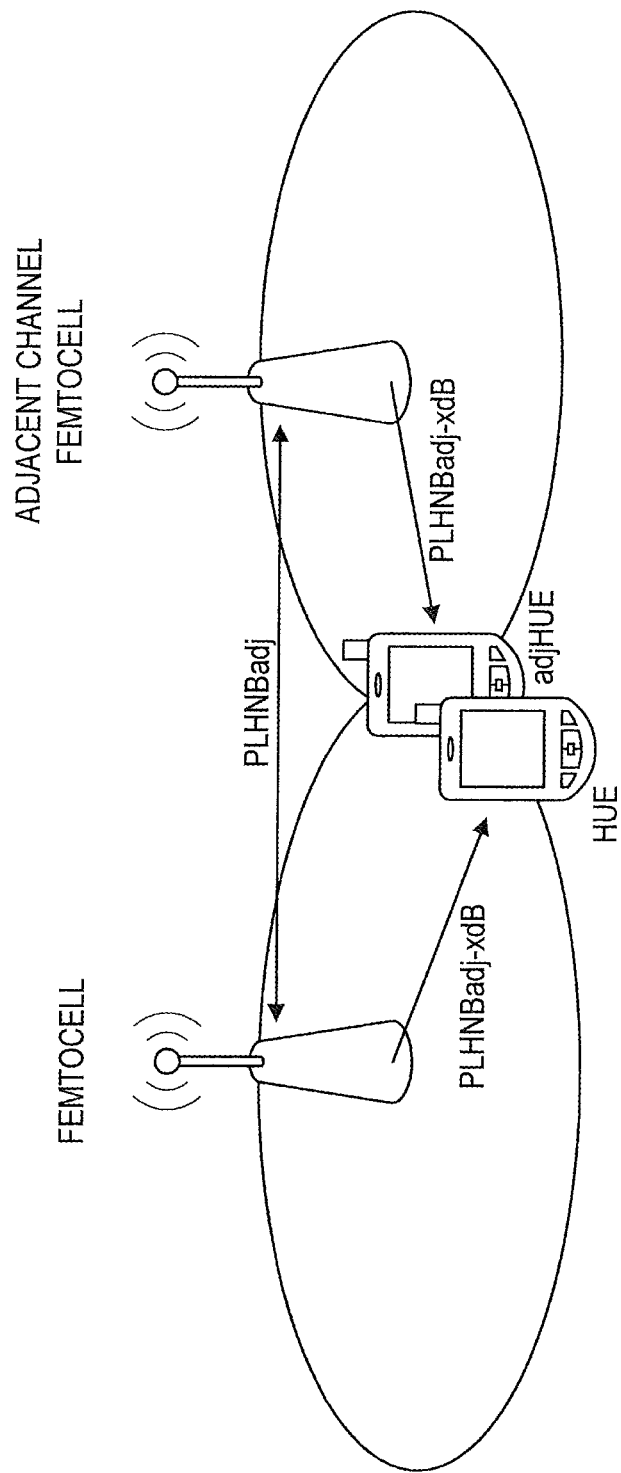
FIG. 10 is an illustrative diagram showing an arrangement example of a macrocell and a femtocell.

This is intended to protect reception quality of an adjacent channel femtocell terminal present at a middle point between the femtocell and the adjacent channel femtocell. That is, as shown in FIG. 10, a path loss between the adjacent channel femtocell and the adjacent channel femtocell terminal (adjHUE) is the same as a path loss between the femtocell and a femtocell terminal (HUE). In this method, a fixed offset value is only added to the pilot channel transmission power of the adjacent frequency channel femtocell and, accordingly, the path loss from the femtocell to the terminal may not be considered.

A value of the pilot channel transmission power of the adjacent frequency channel femtocell may be obtained by the femtocell receiving the report information of the adjacent frequency channel femtocell.

When (CPICH_Po+51) dB obtained by adding an offset 51 dB to the pilot channel transmission power (CPICH_Po) of the adjacent frequency channel is set as the transmission power (HNBTxPo) of the femtocell, a signal-to-noise ratio (adjHUE_CPICH_Ec/No) of the adjacent channel femtocell terminal present at the middle point between the femtocell and the adjacent frequency channel femtocell is:

$$adjHUE\_CPICH\_Ec/No = CPICH\_Po\text{-}PLHNBadj+x\text{-}(HNBTxPo\text{-}PLHNBadj+x\text{-}33)$$
$$= CPICH\_Po\text{-}PLHNBadj+x\text{-}(CPICH\_Po+51\text{-}PLHNBadj+x\text{-}33)$$
$$= -18 \text{ [dB]}$$

since the adjacent channel rejection ratio is 33 dB. Accordingly, −18 dB of a signal-to-noise ratio necessary for reception is secured.

Figure 9B:
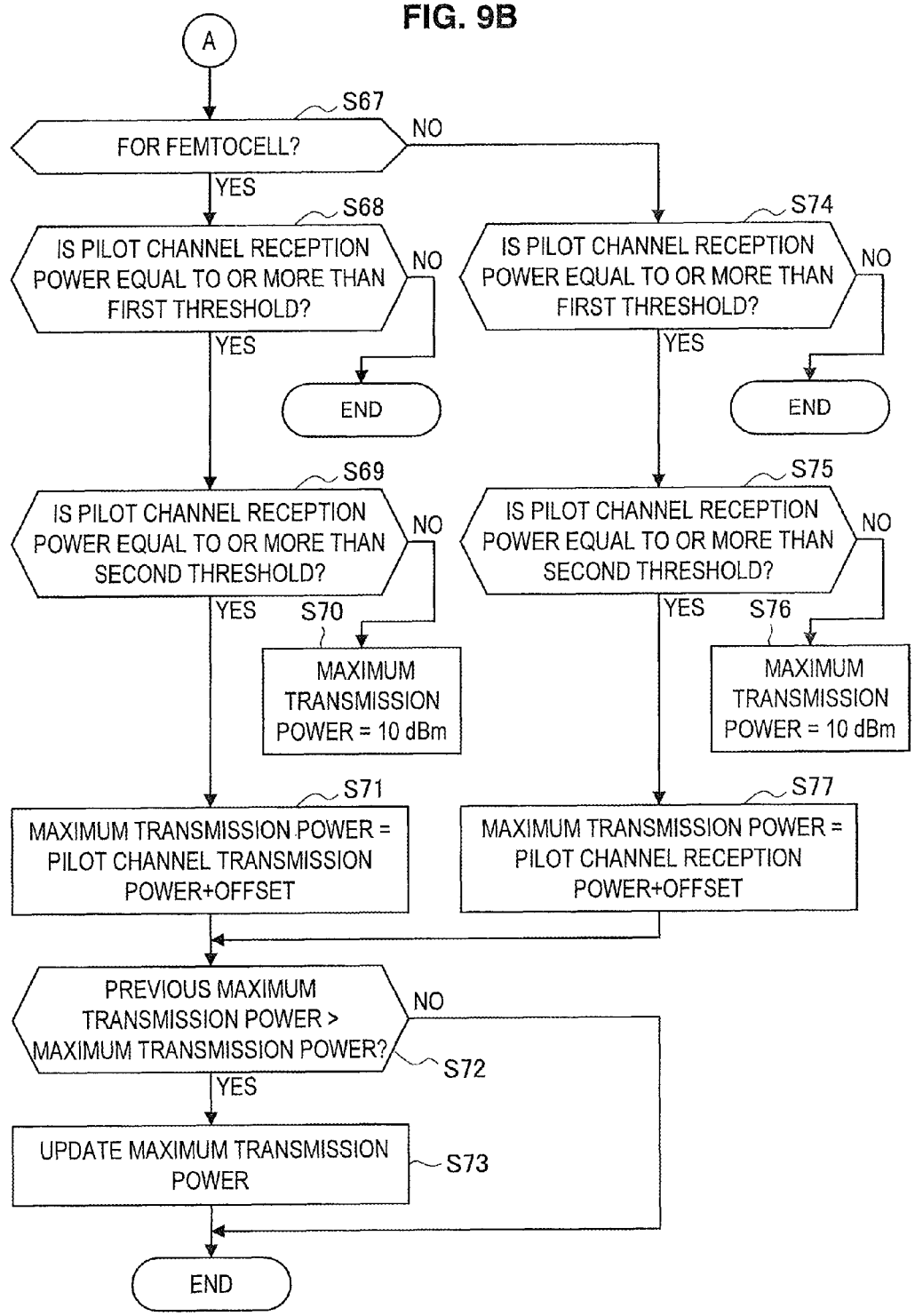
FIG. 9B is a flow diagram showing an operation of the control unit according to an embodiment of the present disclosure.

FIGS. 9A and 9B are flowcharts showing an operation of the control unit 22a of the femtocell 20a according to an embodiment of the present disclosure. The flowcharts shown in FIGS. 9A and 9B show an operation of the control unit 22a when the control unit 22a executes transmission power control. Hereinafter, an operation of the control unit 22a of the femtocell 20a according to an embodiment of the present disclosure will be described with reference to FIGS. 9A and 9B.

The control unit 22a measures a reception power (Ioh) of its own channel using the power measurement unit 51a (step S61). As the power measurement unit 51a measures the reception power (Ioh) of its own channel, a threshold (a second threshold), which will be described later, is set.

If the control unit 22a measures the reception power (Ioh) of its own channel using the power measurement unit 51a in step S61, the control unit 22a sets a carrier frequency of the wireless communication unit 24a to an adjacent channel frequency and measures a reception power (step S62).

The control unit 22a determines whether any adjacent channel adjacent to the carrier frequency set in step S62 is being used (step S63). If it is determined in step S63 that no adjacent channel is being used, the process ends directly. On the other hand, if it is determined in step S63 that an adjacent channel is being used, the report information acquisition unit 52a receives report information from a reception signal of the adjacent channel received by the wireless communication unit 24a (step S64). An operator identification number of the base station, a maximum transmission power, a pilot channel transmission power, a base station identification number, a femtocell identification number, ABS information, RNTP information, and the like are contained in the report information.

If the report information acquisition unit 52a receives the report information in step S64, the power measurement unit 51a measures a reception power of the reference signal for synchronization (a pilot channel) in the adjacent channel (step S65). If the power measurement unit 51a measures the reception power of the reference signal for synchronization in the adjacent channel in step S65, the control unit 22a determines whether the adjacent channel is for the other business (step S66).

If it is determined in step S66 that the adjacent channel is not for the other business, the process ends directly. On the other hand, if it is determined in step S66 that the adjacent channel is for the other business, the control unit 22a determines whether the adjacent channel is for a femtocell (step S67). The determination as to whether the adjacent channel is for a femtocell is made by referencing the base station type information contained in the report information received by the report information acquisition unit 52a.

A process when it is determined in step S67 that the adjacent channel is for a femtocell will be described. If it is determined in step S67 that the adjacent channel is for a femtocell, the control unit 22a determines whether the pilot channel reception power measured by the power measurement unit 51a is equal to or more than a first threshold (step S68). If it is determined in step S68 that the pilot channel reception power measured by the power measurement unit 51a is less than the first threshold, the process ends directly. On the other hand, if it is determined in step S68 that the pilot channel reception power measured by the power measurement unit 51a is equal to or more than the first threshold, the control unit 22a determines whether the pilot channel reception power measured by the power measurement unit 51a is equal to or more than a second threshold (step S69).

If it is determined in step S69 that the pilot channel reception power measured by the power measurement unit 51a is less than the second threshold, the power setting unit 53a sets the maximum transmission power to a predetermined value (e.g., 10 dBm) (step S70). On the other hand, if it is determined in step S69 that the pilot channel reception power measured by the power measurement unit 51a is equal to or more than the second threshold, the power setting unit 53a sets the maximum transmission power to a pilot channel transmission power plus a predetermined offset (step S71).

If the power setting unit 53a sets the maximum transmission power to a pilot channel transmission power plus a predetermined offset in step S71, the power setting unit 53a determines whether the new maximum transmission power is smaller than a previous maximum transmission power (step S72).

If it is determined in step S72 that the new maximum transmission power is smaller than the previous maximum transmission power, the power setting unit 53a updates the maximum transmission power to a set value (step S73), and the process ends. On the other hand, if it is determined in step S72 that the new maximum transmission power is not smaller than the previous maximum transmission power, the process ends directly without doing anything.

Next, a process when it is determined in step S67 that the adjacent channel is not for a femtocell (is for a macrocell) will be described. If it is determined in step S67 that the adjacent channel is not for a femtocell, the control unit 22a determines whether the pilot channel reception power measured by the power measurement unit 51a is equal to or more than the first threshold (step S74). If it is determined in step S74 that the pilot channel reception power measured by the power measurement unit 51a is less than the first threshold, the process ends directly. On the other hand, if it is determined in step S74 that the pilot channel reception power measured by the power measurement unit 51a is equal to or more than the first threshold, the control unit 22a determines whether the pilot channel reception power measured by the power measurement unit 51a is equal to or more than the second threshold (step S75).

If it is determined in step S75 that the pilot channel reception power measured by the power measurement unit 51a is less than the second threshold, the power setting unit 53a sets the maximum transmission power to a predetermined value (e.g., 10 dBm) (step S76). On the other hand, if it is determined in step S75 that the pilot channel reception power measured by the power measurement unit 51*a* is equal to or more than the second threshold, the power setting unit 53*a* sets the maximum transmission power to a pilot channel reception power plus a predetermined offset (step S77).

If the power setting unit 53*a* sets the maximum transmission power to a pilot channel reception power plus a predetermined offset in step S77, the power setting unit 53*a* determines whether the new maximum transmission power is smaller than the previous maximum transmission power (step S72).

If it is determined in step S72 that the new maximum transmission power is smaller than the previous maximum transmission power, the power setting unit 53*a* updates the maximum transmission power to the set value (step S73) and the process ends. On the other hand, if it is determined in step S72 that the new maximum transmission power is not smaller than the previous maximum transmission power, the process ends directly without doing anything.

The operation of the control unit 22*a* of the femtocell 20*a* according to an embodiment of the present disclosure has been described above with reference to FIGS. 9A and 9B. As described above, when the adjacent channel is for the femtocell, the transmission power of the femtocell 20*a* or 20*b* is set using a different calculation method from the case of the macrocell, thereby improving communication quality of the overall data communication system.

2-3. Method of Excluding Power from Adjacent Femtocell

As a second method, a method of setting the transmission power of the femtocell using a method of excluding power from an adjacent femtocell will be described.

When there are limits on the maximum transmission power of a wireless station, a minimum value among a plurality of maximum transmission powers is adopted. As shown previously, in the 3GPP TS 25.104 that is a standard of a radio characteristic of a base station of a UMTS scheme, the maximum transmission power of the femtocell is defined as +20 dBm. Accordingly, when a power ratio of the pilot channel to a total transmission power of the femtocell is, for example, −10 dB and a minimum transmission power of the femtocell is, for example, −10 dBm, (CPICH_Po+51) dB becomes +31 dBm. However, in fact, the maximum transmission power is limited to the upper limit of +20 dBm.

Accordingly, in this case, when the radio wave intensity of the adjacent frequency channel by the adjacent frequency channel femtocell is dominant as a result of classifying the results of measuring the adjacent frequency channel in the femtocell 20*a* or 20*b* for each base station type, the femtocell 20*a* or 20*b* may not use a radio wave intensity of the adjacent frequency channel by the adjacent frequency channel femtocell to calculate the maximum transmission power.

Figure 11:
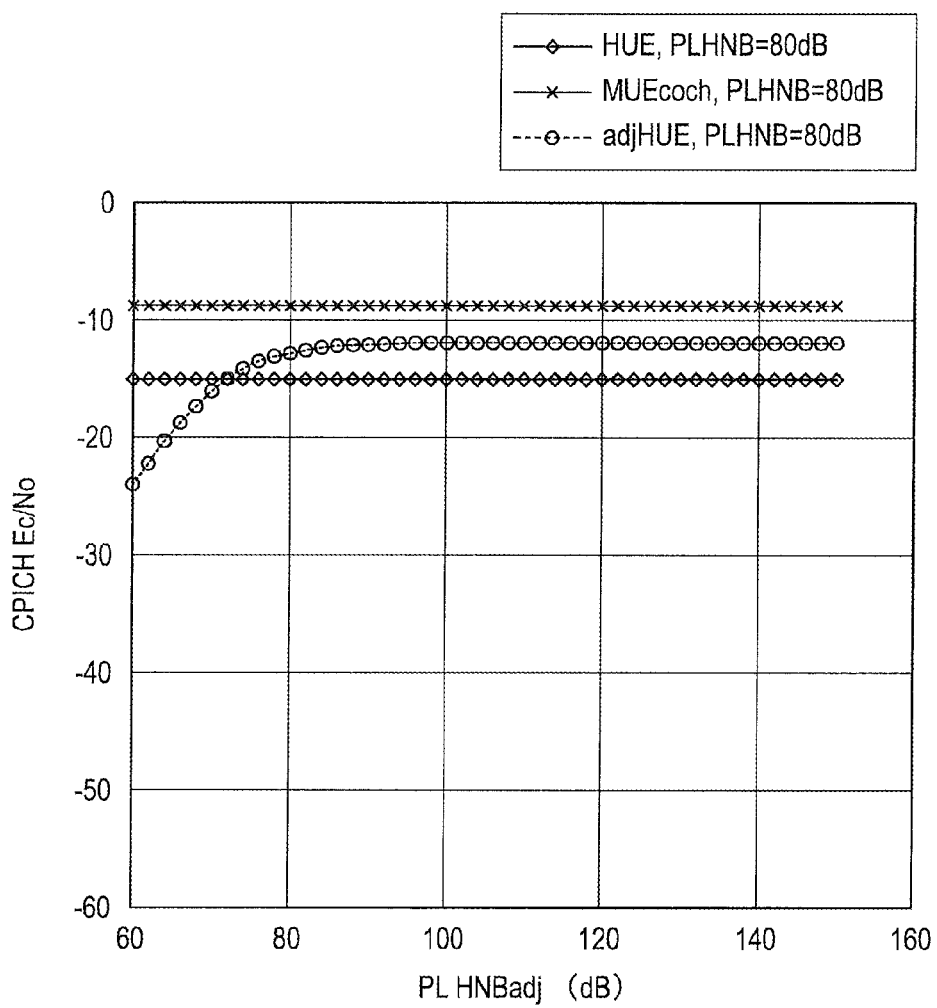
FIG. 11 is an illustrative diagram showing signal-to-noise power ratios of a macrocell terminal and a femtocell terminal after control by the control unit according to an embodiment of the present disclosure.

FIG. 11 shows a calculation example of CPICH Ec/No of a macrocell terminal (MUE), a femtocell terminal (HUE), and an adjacent channel femtocell terminal (adjHUE) when a path loss (PLHNBadj) between an adjacent channel femtocell and a femtocell is changed. A macrocell, a femtocell, an adjacent channel macrocell, and an adjacent channel femtocell are arranged as shown in FIG. 5, and a radio wave intensity of the adjacent frequency channel femtocell is dominant in the adjacent frequency channel. When PLHNBadj is equal to or less than 90 dB, the radio wave intensity of the adjacent frequency channel is more than −105 dBm. Accordingly, in a scheme of related art, the maximum transmission power of the femtocell is limited. However, in the calculation example shown in FIG. 11, the radio wave intensity of the adjacent frequency channel is treated as noise and only added to a value of No of CPICH Ec/No of each terminal. Further, when PLHNBadj is equal to or more than 70 dB, a signal-to-noise ratio necessary for reception is satisfied in all the terminals, and the above-described problem as shown in FIG. 6 is resolved by this method, as can be confirmed.

As described above, when the adjacent channel is a femtocell, the transmission power of the femtocell 20*a* or 20*b* is set using the method of excluding a power from the adjacent femtocell, thereby improving communication quality of the overall data communication system.

2-4. Method of Setting Threshold and Offset Value According to Base Station Type As a third method, a method of setting a transmission power of a femtocell using a method of setting a threshold and an offset value according to a base station type will be described.

In a method of related art, two thresholds are set for a pilot channel reception power to protect a macrocell of an adjacent frequency channel. For example, in the case of a UMTS scheme, a determination is made as to whether the pilot channel reception power is equal to or more than −105 dBm (a first threshold) or is equal to or more than a reception power in a downlink frequency band of the femtocell Ioh-43 dB (a second threshold) to determine the maximum transmission power. When the adjacent frequency channel is the femtocell, for example, −70 dBm obtained by subtracting a coverage 80 dB from a pilot channel transmission power 10 dBm may be used as the first threshold.

The method of setting the transmission power of the femtocell may be a method of setting the value according to the base station type as the threshold and the offset value of the reception power of the reference signal for synchronization for determination as to whether to limit the maximum transmission power, as described above, that is, a method of setting a different threshold and a different offset value according to whether the base station is a macrocell or a femtocell.

Here, the measurement of the power of the adjacent frequency channel by the femtocell 20*a* or 20*b* will be described. The measurement of the power of the adjacent frequency channel by the femtocell 20*a* or 20*b* is realized, for example, by changing a setting of the frequency synthesizer of the wireless communication unit 24*a* or 24*b* of the femtocell 20*a* or 20*b* using the control unit 22*a* or 22*b*, temporarily changing the reception frequency to the adjacent frequency channel, and measuring the reception power using the control unit 22*a* or 22*b* at a time when the femtocell 20*a* or 20*b* is powered on or reset, during a period of time in which there is no terminal making communication using the femtocell 20*a* or 20*b*, or the like.

Figure 12:
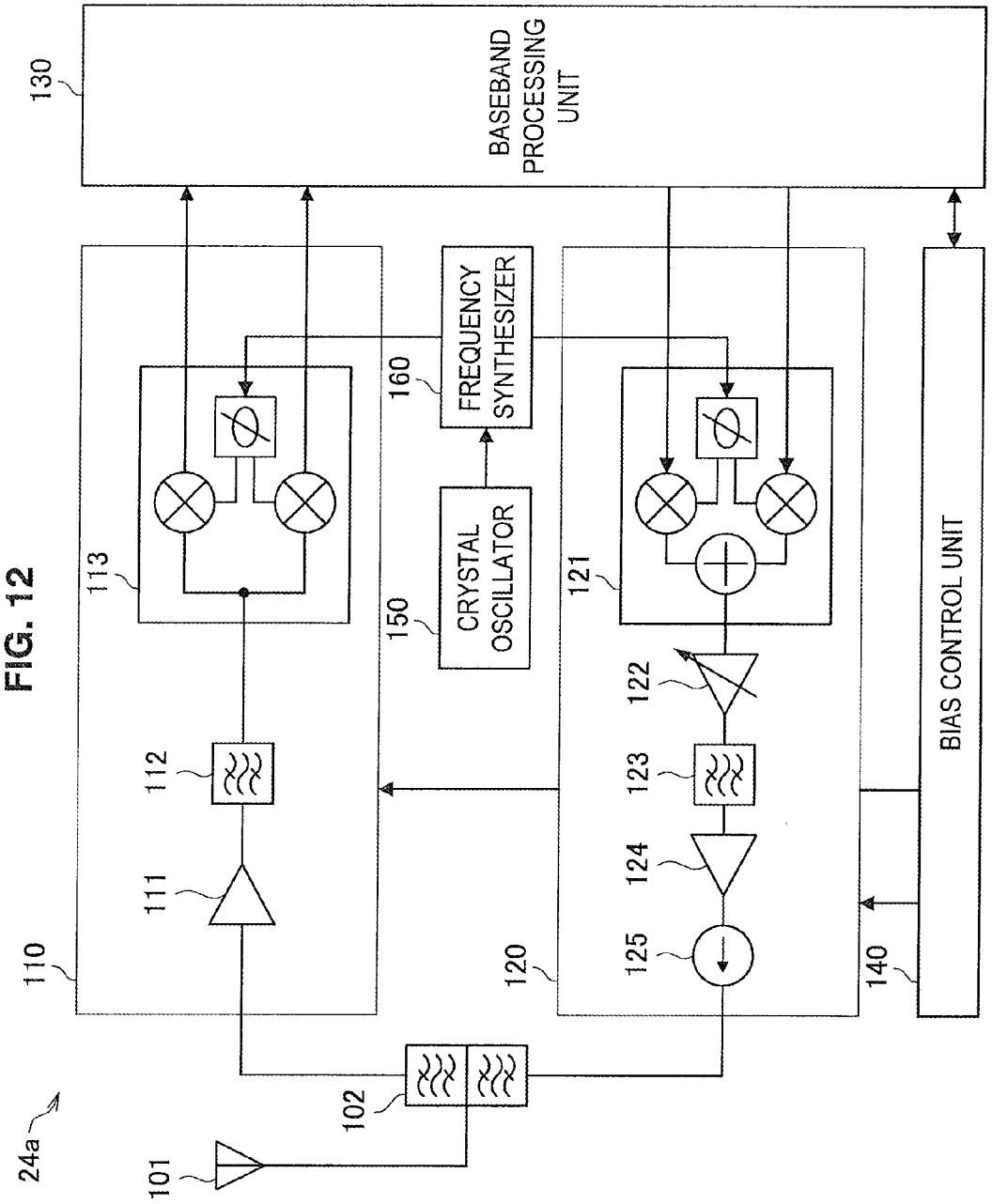
FIG. 12 is an illustrative diagram showing a configuration example of a wireless communication unit.

FIG. 12 is an illustrative diagram showing a configuration example of the wireless communication unit 24*a* in the femtocell 20*a* according to an embodiment of the present disclosure. As shown in FIG. 12, the wireless communication unit 24*a* includes an antenna 101, a duplexer 102, a reception processing unit 110, a transmission processing unit 120, a baseband processing unit 130, a bias control unit 140, a crystal oscillator 150, and a frequency synthesizer 160.

The reception processing unit 110 includes a reception amplifier 111, a reception RF filter 112, and a quadrature demodulator 113. Also, the transmission processing unit 120 includes a quadrature modulator 121, a transmission variable-gain amplifier 122, a transmission RF filter 123, a transmission power amplifier 124, and an isolator 125.

A signal received by the antenna 101 is sent to the reception processing unit 110 via the duplexer 102. The reception processing unit 110 amplifies the signal received from the duplexer 102 using the reception amplifier 111, executes predetermined filtering using the reception RF filter 112, and demodulates the signal using the quadrature demodulator 113. The demodulated signal is sent to the baseband processing unit 130.

Further, a signal sent from the baseband processing unit 130 to the transmission processing unit 120 is modulated by the quadrature modulator 121, amplified by the transmission variable-gain amplifier 122, subjected to predetermined filtering in the transmission RF filter 123, amplified by the transmission power amplifier 124, and sent to the duplexer 102 via the isolator 125 that prevents backflow of a signal. Also, the signal sent to the duplexer 102 is transmitted from the antenna 101.

The bias control unit 140 controls bias for the reception processing unit 110 and the transmission processing unit 120. Further, the frequency synthesizer 160 receives a clock from the crystal oscillator 150 to generate a high frequency clock at a predetermined frequency. The generated clock is supplied to the quadrature demodulator 113 and the quadrature modulator 121 and used for demodulation and modulation.

The measurement of the power of the adjacent frequency channel by the femtocell 20*a* is realized by changing a setting of the frequency synthesizer 160 of the wireless communication unit 24*a* using the control unit 22*a*, temporarily changing a reception frequency to the adjacent frequency channel, and measuring the reception power using the control unit 22*a*.

In a UMTS scheme, powers of pilot channels of a plurality of base stations can be divided and measured by de-spreading a received baseband signal in a scrambling code of the pilot channel that can be allocated to each base station.

Figure 13:
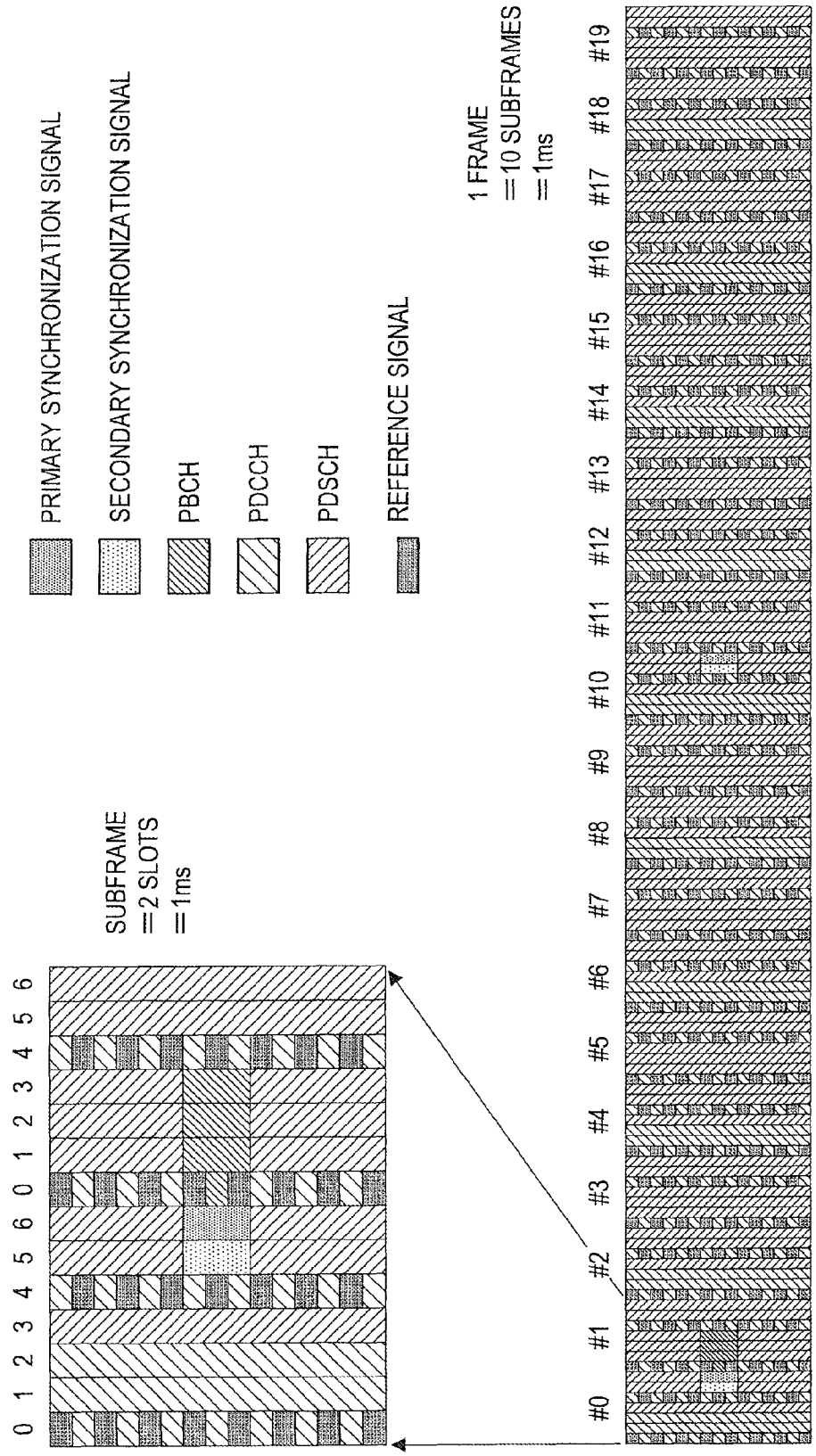
FIG. 13 is an illustrative diagram showing a structure of a downlink radio frame of an LTE scheme.

Further, in the LTE scheme, as shown in FIG. 13, positions of a sub-carrier and a symbol in which a reference signal (CRS) is arranged in each subframe are determined according to the identification number of the base station, and phase rotation is assigned to the reference signal according to the identification number of the base station. The power of the adjacent frequency channel can be measured by measuring intensities of the reference signals and dividing powers of the reference signals of a plurality of base stations.

When the power of the reference signal of the base station is measured, for example, variable factors due to a change in the radio environment can be absorbed by performing multiple measurements on a plurality of radio frames and averaging the measured values.

However, in versions subsequent to Release 10 of the LTE scheme, there is likely to be an Almost Blank Subframe (ABS) that is a subframe containing no reference signal. Because of this, when a position of radio resources in which a reference signal to be measured by the femtocell is arranged is determined based on only the identification number of the base station, an error may be generated.

For example, the femtocell 20*a* or 20*b* receives report information of the adjacent frequency channel base station, obtains information (ABS information) on a number of the subframe containing no reference signal, and excludes the subframe containing no reference signal from a measurement target to perform measurement. Thus, as the measurement is performed while excluding the subframe containing no reference signal from the measurement target, the femtocell 20*a* or 20*b* can perform the power measurement with higher accuracy.

As important system information is transmitted in first to sixth subframes, the ABS is not set but the reference signal is transmitted in the sixth subframe in each base station, and another base station that has shifted the subframe in time is caused to use the ABS, such that the important system information can be protected from interference. When the femtocell 20*a* or 20*b* measures the reference signal of the peripheral base station, the femtocell measures only a subframe having a specific number that is known to contain the reference signal in advance and have less interference from other base stations, such as only the sixth subframe of the base station as a measurement target. Accordingly, the femtocell 20*a* or 20*b* can perform highly accurate power measurement.

Figure 14:
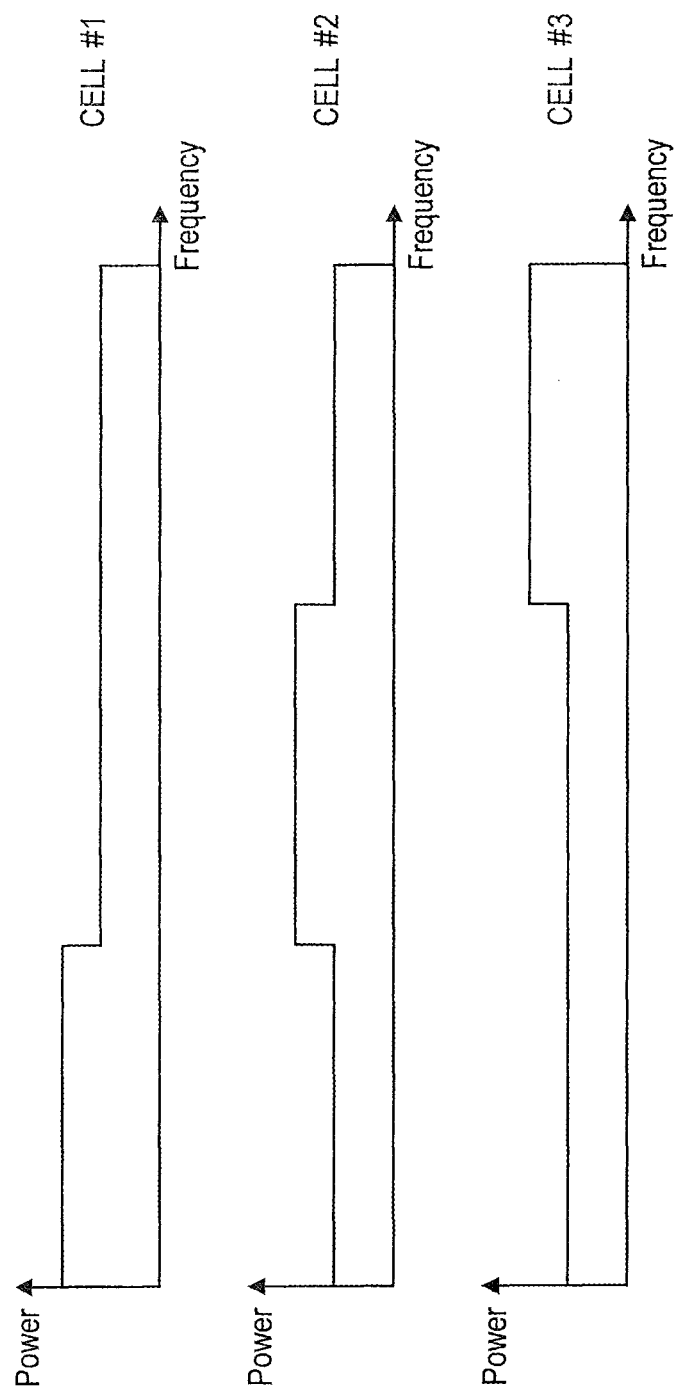
FIG. 14 is an illustrative diagram showing an example of a relationship between a frequency and a transmission power when division into a plurality of frequency blocks is performed in an LTE scheme.

Further, in the LTE scheme, as shown in FIG. 14, in order to reduce interference of a terminal at a cell edge, a frequency band operated by the base station is divided into frequency blocks and a transmission power for each frequency block is changed. Also, in the LTE scheme, the frequency block with a high transmission power can be allocated to the terminal at the cell edge and the frequency block with a low transmission power can be allocated to a terminal at a cell center. For example, the femtocell 20*a* or 20*b* performs power measurement of the reference signal of the adjacent frequency channel base station, receives the report information, obtains transmission power information (RNTP information) for each frequency block, and calculates a path loss from the adjacent frequency channel base station to the femtocell. The femtocell 20*a* or 20*b* can perform highly accurate power measurement by measuring only the reference signal of the frequency block that can be allocated to a place of the femtocell 20*a* or 20*b*.

Next, a method of analyzing a base station type based on report information channel reception will be described. A report information channel of the base station is a channel used to transmit system information from a network to all terminals in coverage of the base station. The report information channel may be received by only a downlink reception function of the femtocell 20*a* or 20*b*. This report information contains an operator identification number of the base station, a maximum transmission power, a pilot channel transmission power, a base station identification number, a femtocell identification number, ABS information, RNTP information, and the like. For example, when the femtocell 20*a* or 20*b* performs the measurement of the power of the adjacent frequency channel, the femtocell 20*a* or 20*b* also performs report information channel reception and can determine whether the adjacent frequency channel base station is a femtocell or not based on whether the femtocell identification number is a significant number.

2-5. Method of Setting a Plurality of Maximum Transmission Power Candidates

As a fourth method, a method of setting a transmission power of a femtocell using a method of setting a plurality of maximum transmission power candidates will be described.

In order to set a plurality of maximum transmission power candidates, for example, when a plurality of pilot channels are detected at downlink adjacent frequencies, the femtocell 20*a* or 20*b* may calculate a maximum transmission power for each base station type and adopt a minimum value among the maximum transmission powers as the maximum transmission power of the femtocell.

The femtocell 20*a* or 20*b* obtains a limit on a femtocell maximum transmission power for an individual base station by associating a base station identification number, a base station type (whether the base station is a femtocell or not), and a pilot channel reception power of the adjacent frequency channel. Also, the femtocell 20a or 20b adopts the most severe value among such limits (the smallest value of the maximum transmission powers) and sets the value as the maximum transmission power of the femtocell 20a or 20b.

For a plurality of base stations that have measured the pilot channel of the adjacent frequency channel base station, the femtocell 20a or 20b individually calculates the femtocell maximum transmission power using the following equation:

[femtocell maximum transmission power]=[adjacent channel base station pilot channel reception power]+[offset value] (1)

A method in which, when the adjacent frequency channel base station is, for example, a macrocell of a UMTS scheme, the femtocell 20a or 20b uses 98 dB as the offset value in Equation (1) and when the adjacent frequency channel base station is a femtocell, the femtocell 20a or 20b uses an infinite value as the offset value in Equation (1) to remove the limit on the femtocell may be used.

A method in which, when the adjacent frequency channel base station is, for example, a macrocell of a UMTS scheme, the femtocell 20a or 20b uses 98 dB as the offset value in Equation (1), and when the adjacent frequency channel base station is a femtocell, the femtocell uses a value of 51 dB as an offset value in the following equation (2) not to consider the path loss as a limit on the femtocell may also be used.

[femtocell maximum transmission power]=[adjacent channel base station pilot channel transmission power]+[offset value] (2)

Thus, using the method of assigning the offset value or the calculation equation to each type of the adjacent frequency channel base station, the femtocell 20a or 20b individually calculates the limit on the maximum transmission power of the femtocell and adopts a minimum value among the maximum transmission powers. As described above, the femtocell 20a or 20b sets the transmission power of the femtocell 20a or 20b using the method of setting a plurality of maximum transmission power candidates, thereby improving the communication quality of the overall data communication system.

3. Conclusion

As described above, according to the embodiment of the present disclosure, in the method in which the base station measures a downlink reception power of an adjacent frequency channel base station and the measured reception power plus the offset value is determined as the maximum transmission power of the base station, the offset value or the threshold according to the base station type of the adjacent frequency channel base station is used. As the maximum transmission power of the base station is set as described above, it is possible, in the embodiment of the present disclosure, to provide a wireless base station and a transmission power control method capable of protecting a service area of the adjacent frequency channel base station and autonomously setting the maximum transmission power of the base station without unnecessarily limiting the service area of the base station.

Further, according to the embodiment of the present disclosure, if there is a femtocell base station of an adjacent frequency channel operated by another operator when a femtocell base station starts up, the femtocell can autonomously set its own maximum transmission power to protect a service area of the adjacent frequency channel femtocell base station while maintaining the service area of the femtocell base station.

Further, according to the embodiment of the present disclosure, setting a fair maximum transmission power to protect a terminal located in the middle of two femtocells can be simply autonomously realized. Furthermore, according to the embodiment of the present disclosure, the transmission power control is not performed each time a femtocell starts up in the vicinity, thereby achieving a stable operation of an overall network.

Further, a series of control processes by each device described in this disclosure may be realized by any of software, hardware, and a combination of the software and the hardware. A program constituting the software is, for example, stored in a storage medium provided inside or outside each device in advance. Also, each program is, for example, loaded to a RAM when executed and then executed by a processor.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A wireless base station comprising:
a power measurement unit for measuring a power of a reference signal for synchronization at a downlink adjacent frequency;
a base station type acquisition unit for acquiring a type of a base station that transmits the signal at the downlink adjacent frequency; and
a power setting unit for setting a maximum transmission power based on a measurement value of the power measured by the power measurement unit and the type of the base station acquired by the base station type acquisition unit.

(2) The wireless base station according to (1), wherein
the power setting unit has a first pattern in which a measurement value of a reception power of the reference signal for synchronization at the downlink adjacent frequency plus a first offset value is set as the maximum transmission power, and a second pattern in which a measurement value of a transmission power of the reference signal for synchronization at the downlink adjacent frequency plus a second offset value is set as the maximum transmission power, and selects the first pattern or the second pattern as a set pattern for the maximum transmission power according to the type of the base station acquired by the base station type acquisition unit.

(3) The wireless base station according to (2), wherein
in the first pattern, the power setting unit sets values according to the type of the base station acquired by the base station type acquisition unit as a threshold of the reception power of the reference signal for synchronization for determination as to whether to limit the maximum transmission power, and the first offset value.

(4) The wireless base station according to any one of (1) to (3), wherein
the power setting unit excludes a reception power of the reference signal for synchronization at the downlink adjacent frequency from a maximum transmission power calculation target when the type of the base station acquired by the base station type acquisition unit is a small base station.

(5) The wireless base station according to any one of (1) to (4), wherein
when the power measurement unit has detected a plurality of reference signals for synchronization at the downlink adjacent frequency, the base station type acquisition unit acquires the type of the base station for each reference signal for synchronization, and the power setting unit sets, as the maximum transmission power, a minimum value among a plurality of maximum transmission powers calculated from power measurement values of the plurality of reference signals for synchronization according to the type of the base station acquired by the base station type acquisition unit.

(6) The wireless base station according to any one of (1) to (5), wherein
the power measurement unit acquires information of a frame containing the reference signal for synchronization from report information, and measures a reception power of the reference signal for synchronization of the frame.

(7) The wireless base station according to any one of (1) to (7), wherein
the power measurement unit measures a reception power of the reference signal for synchronization only in a specific frame known to contain the reference signal for synchronization in advance.

(8) The wireless base station according to any one of (1) to (7), wherein
when an adjacent frequency channel base station divides a used downlink frequency band into a plurality of frequency blocks and changes transmission powers of the respective frequency blocks, the power measurement unit acquires information of a transmission power for each frequency block from report information and measures a reception power of the reference signal for synchronization of the frequency block.

(9) A transmission power control method comprising:
measuring a power of a reference signal for synchronization at a downlink adjacent frequency;
acquiring a type of a base station that transmits the signal at the downlink adjacent frequency; and
setting a maximum transmission power based on a measurement value of the power measured in the power measurement step and the type of the base station acquired in the base station type acquisition step.

(10) A computer program for causing a computer to execute:
measuring a power of a reference signal for synchronization at a downlink adjacent frequency;
acquiring a type of a base station that transmits the signal at the downlink adjacent frequency; and
setting a maximum transmission power based on a measurement value of the power measured in the power measurement step and the type of the base station acquired in the base station type acquisition step.

The present disclosure contains subject matter related to that disclosed in Japanese Priority Patent Application JP 2011-172927 filed in the Japan Patent Office on Aug. 8, 2011, the entire content of which is hereby incorporated by reference.

What is claimed is:

1. A wireless base station comprising:
a processor configured to:
measure a power of a reference signal for synchronization at a downlink adjacent frequency;
acquire a type of a base station that transmits the reference signal at the downlink adjacent frequency; and
set a maximum transmission power of the wireless base station based on a measurement value of the measured power of the reference signal and an offset value determined based on the acquired type of the base station, wherein the offset value is a sum of an adjacent channel rejection ratio and a predetermined signal-to-noise ratio when the acquired type of the base station is a first base station type, and wherein
a predetermined value of power is set as the maximum transmission power when the measurement value of the measured power of the reference signal is between a first threshold and a second threshold.

2. The wireless base station according to claim 1, wherein a first pattern in which a measurement value of a reception power of the reference signal for synchronization at the downlink adjacent frequency plus a first offset value is set as the maximum transmission power, and a second pattern in which a measurement value of a transmission power of the reference signal for synchronization at the downlink adjacent frequency plus a second offset value is set as the maximum transmission power, and the first pattern or the second pattern is selected as a set pattern, for the maximum transmission power according to the acquired type of the base station, when the measurement value of the measured power of the reference signal is equal to or more than the second threshold.

3. The wireless base station according to claim 2, wherein in the first pattern, values are set according to the acquired type of the base station as a threshold of the reception power of the reference signal for synchronization for determination as to whether to limit the maximum transmission power, and the first offset value.

4. The wireless base station according to claim 1, wherein the processor is further operable to exclude a reception power of the reference signal for synchronization at the downlink adjacent frequency from a maximum transmission power calculation target when the acquired type of the base station is a femtocell base station.

5. The wireless base station according to claim 1, wherein when a plurality of reference signals for synchronization at the downlink adjacent frequency are detected, the type of the base station for each reference signal for synchronization is acquired, and the maximum transmission power is set as a minimum value among a plurality of maximum transmission powers calculated from power measurement values of the plurality of reference signals for synchronization according to the acquired type of the base station.

6. The wireless base station according to claim 1, wherein the processor is further configured to acquire information of a frame containing the reference signal for synchronization from report information, and measure a reception power of the reference signal for synchronization of the frame.

7. The wireless base station according to claim 1, wherein the processor is further configured to measure a reception power of the reference signal for synchronization only in a specific frame known to contain the reference signal for synchronization in advance.

8. The wireless base station according to claim 1, wherein when an adjacent frequency channel base station divides a used downlink frequency band into a plurality of frequency blocks and changes transmission powers of the respective plurality of frequency blocks, information of a transmission power for each frequency block of the plurality of frequency blocks is acquired from report information and a reception power of the reference signal for synchronization of the frequency block is measured.

9. A method for controlling transmission power of a wireless base station, the method comprising:
measuring a power of a reference signal for synchronization at a downlink adjacent frequency;

acquiring a type of a base station that transmits the reference signal at the downlink adjacent frequency; and setting a maximum transmission power of the wireless base station based on a measurement value of the measured power of the reference signal and an offset value determined based on the acquired type of the base station, wherein the offset value is a sum of an adjacent channel rejection ratio and a predetermined signal-to-noise ratio when the acquired type of the base station is a first base station type, and wherein a predetermined value of power is set as the maximum transmission power when the measurement value of the measured power of the reference signal is between a first threshold and a second threshold, and the measured power of the reference signal plus the determined offset value is set as the maximum transmission power when the measurement value of the measured power of the reference signal is equal to or more than the second threshold.

10. A non-transitory computer-readable medium, having stored thereon, a computer program having at least one code section executable by a computer, thereby causing the computer to perform the steps comprising:

measuring a power of a reference signal for synchronization at a downlink adjacent frequency;

acquiring a type of a base station that transmits the reference signal at the downlink adjacent frequency; and setting a maximum transmission power of a wireless base station based on a measurement value of the measured power of the reference signal and an offset value determined based on the acquired type of the base station, wherein the offset value is a sum of an adjacent channel rejection ratio and a predetermined signal-to-noise ratio when the acquired type of the base station is a first base station type, and wherein a predetermined value of power is set as the maximum transmission power when the measurement value of the measured power of the reference signal is between a first threshold and a second threshold, and the measured power of the reference signal plus the determined offset value is set as the maximum transmission power when the measurement value of the measured power of the reference signal is equal to or more than the second threshold.

11. The wireless base station according to claim 1, wherein the acquired type of the base station is one of a femtocell base station and a macrocell base station.

12. The wireless base station according to claim 1, wherein the wireless base station is operated by a first operator and the acquired base station that transmits the reference signal is operated by a second operator.

13. The wireless base station according to claim 1, wherein the measured power of the reference signal plus the determined offset value is set as the maximum transmission power when the measurement value of the measured power of the reference signal is equal to or more than the second threshold.

14. The wireless base station according to claim 1, wherein the first base station type is a femtocell base station.

* * * * *